Jan. 16, 1968  H. NERWIN  3,364,027
PHOTOGRAPHIC FILM PRODUCT
Filed Oct. 1, 1962  4 Sheets-Sheet 1
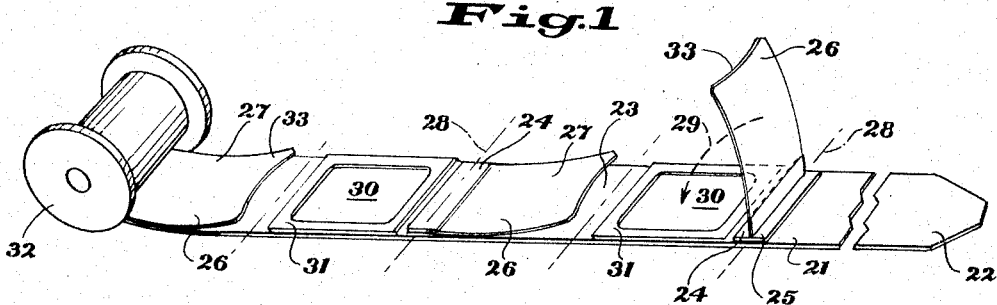
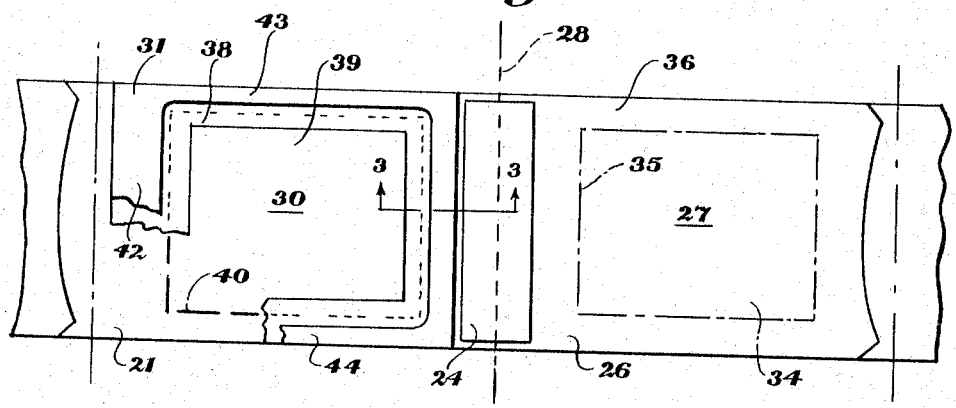
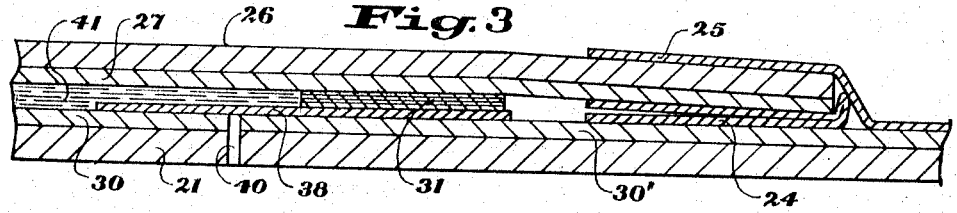
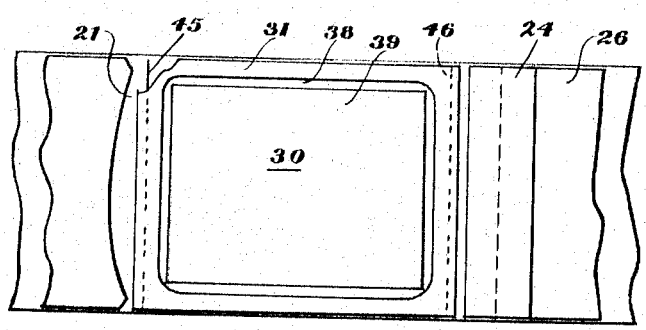
Hubert Nerwin
INVENTOR.
BY R. Frank Smith
Robert F. Crocker
ATTORNEYS

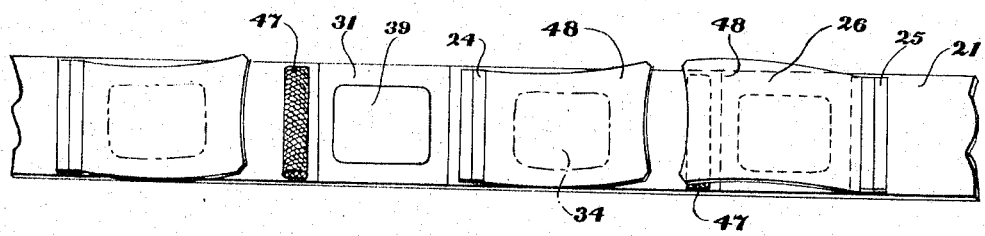
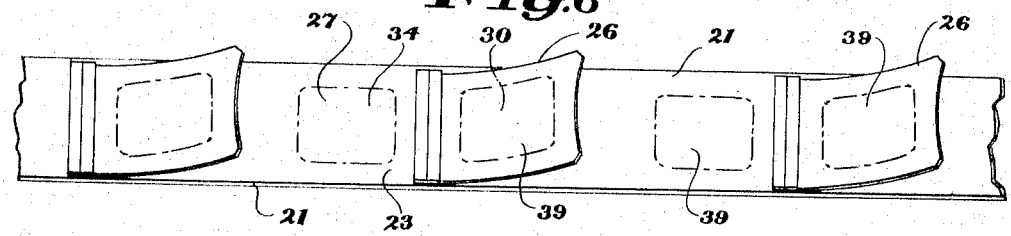
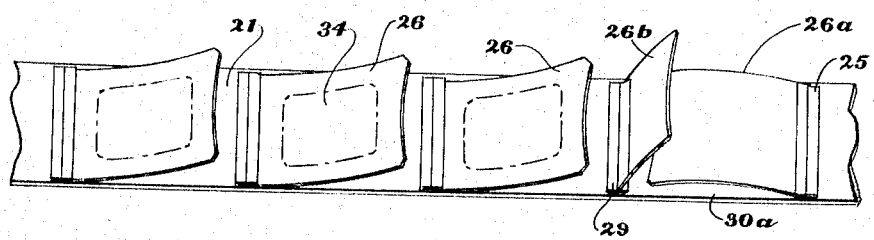
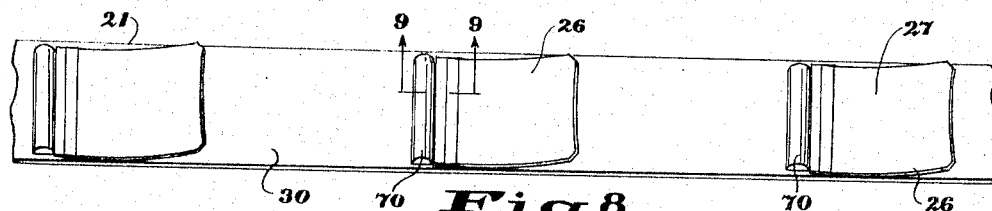
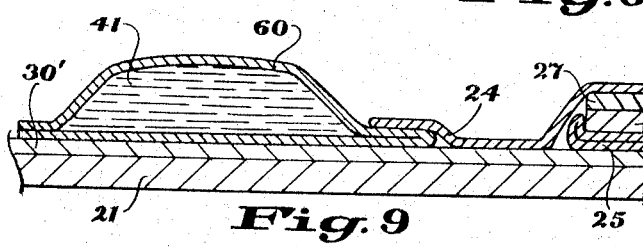
Hubert Nerwin
INVENTOR.

Jan. 16, 1968    H. NERWIN    3,364,027
PHOTOGRAPHIC FILM PRODUCT
Filed Oct. 1, 1962    4 Sheets-Sheet 3
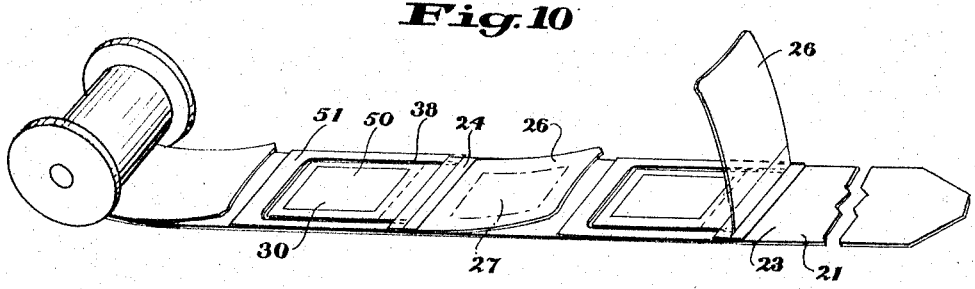
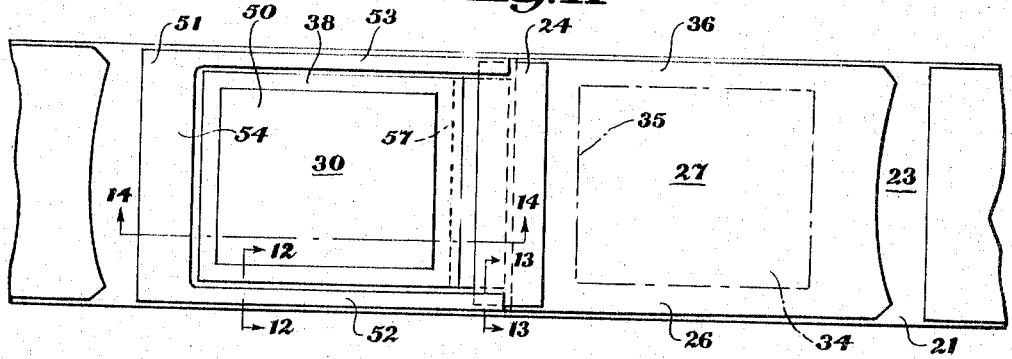
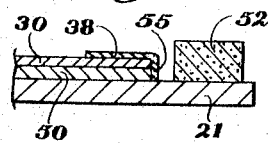    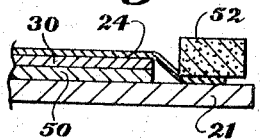
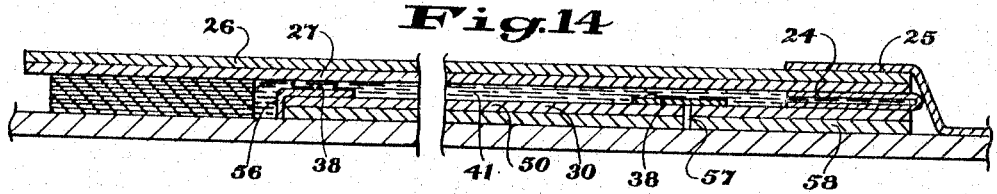
Hubert Nerwin
INVENTOR.
BY R. Frank Smith
Robert F. Crocker
ATTORNEYS

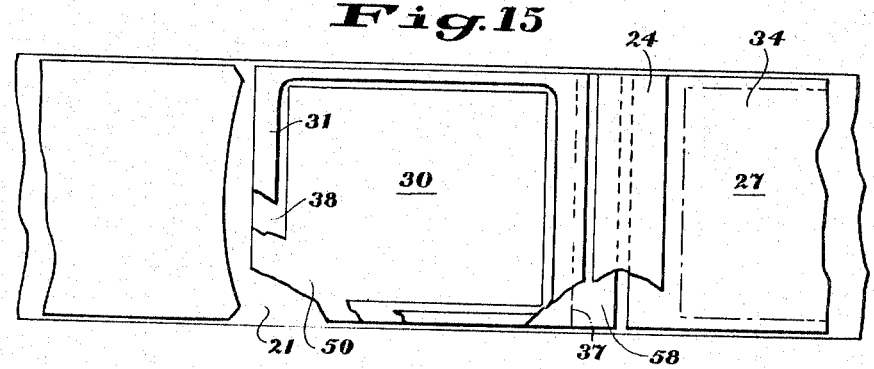
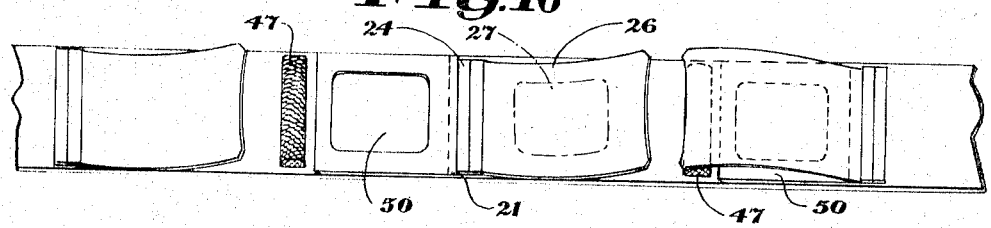
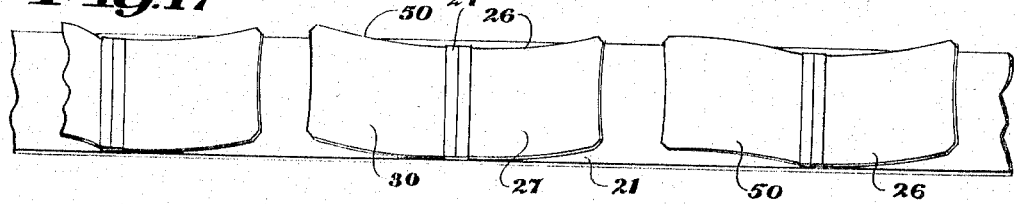
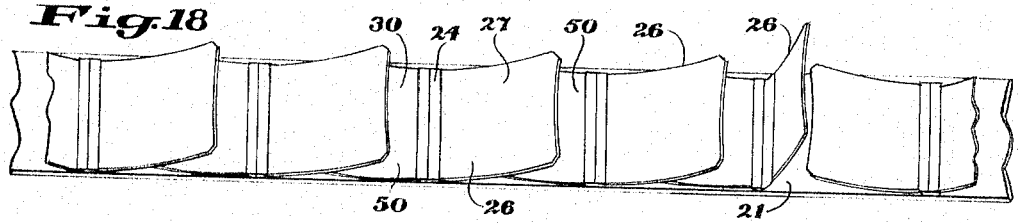
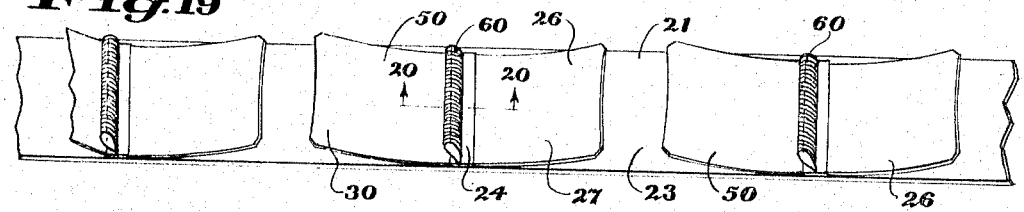
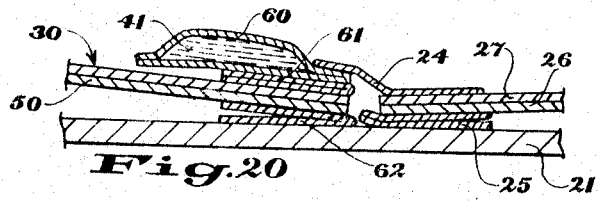

United States Patent Office 3,364,027
Patented Jan. 16, 1968

3,364,027
PHOTOGRAPHIC FILM PRODUCT
Hubert Nerwin, Rochester, N.Y., assignor to Eastman Kodak Company, Rochester, N.Y., a corporation of New Jersey
Filed Oct. 1, 1962, Ser. No. 227,312
2 Claims. (Cl. 96—78)

This invention relates to the field of image transfer photography and more particularly to an improved film product for use in such fields.

Self-processing cameras are well known wherein a sensitized film is first exposed and then processed in conjunction with a sheet or strip of transfer-image-receptive material and a viscous processing fluid. It is customary with such apparatus to provide separate coils or rolls of receiver and negative material, frequently attached to a common leader, but requiring that they be separately positioned and mounted within the camera. This results in a considerable inconvenience to the user in loading the camera.

It is an object of this invention to provide a new and improved photographic film product for use with image transfer cameras wherein both the photo-sensitive image-receptive film material and the transfer-image-repective material are combined in a single unitary roll, which, if desired, may also carry the fluid required for processing.

It is a further object to provide such a composite film product wherein one or the other of the two types of image-receptive areas are carried by a plurality of sheets hinged along their trailing edges to a carrier strip which, in turn, carries the associated image-receptive areas of the other type. The arrangement is such that when one of the photo-sensitive areas has been exposed, the associated hinged sheet may be folded over about its hinge line so that the photo-sensitive area lies in substantial face-to-face relationship with the associated transfer-image-receptive area for processing in conjunction therewith.

Further objects will become apparent from the following description and claims particularly when considered in the light of the accompanying drawings wherein:

FIG. 1 is a perspective view showing one form of composite film material made in accordance with my invention;

FIG. 2 is a plan view of a section of the film material shown in FIG. 1;

FIG. 3 is an enlarged cross sectional view taken on the line 3—3 of FIG. 2, but with the hinged sheet inverted about its hinge axis;

FIG. 4 is a view similar to FIG. 2 but showing a modified form of my invention;

FIGS. 5–8 are fragmentary perspective views showing still further modifications of my invention;

FIG. 9 is an enlarged fragmentary sectional view taken substantially on the line 9—9 of FIG. 8;

FIG. 10 is a view similar to FIG. 1 but showing another modification of my invention;

FIG. 11 is a fragmentary plan view of the film product shown in FIG. 10;

FIGS. 12 and 13 are cross sections taken on the lines 12—12 and 13—13 of FIG. 11;

FIG. 14 is a longitudinal section taken on substantially the line 14—14 of FIG. 11 but showing the hinged sheet in the position which it assumes during processing;

FIG. 15 is a view similar to FIG. 2 showing another modification of my invention;

FIGS. 16–19 are fragmentary perspective views of still further forms of my invention;

And FIG. 20 is an enlarged sectional view taken substantially on the line 20—20 of FIG. 19.

Considering first the form of my invention shown in FIGS. 1–3, my composite film product 20 comprises an elongated carrier strip 21, the leading end portion 22 of which serves as a leader for threading through a camera. Preferably, at least this leading portion of strip 21 is opaque so as to protect the photo-sensitive surfaces carried by the trailing portion of the strip 21 against exposure during loading of a camera and handling of the film. Individually secured to the front face 23 of strip 21 by adhesive hinge strips 24, 25 are a plurality of sheets 26 each having an image-receptive surface or layer 27 which provides an image-receptive area for one frame. These sheets 26 are normally positioned on strip 21 so that their hinged ends are trailing and their image-receptive surfaces or layers 27 are facing outwardly away from the strip 21. However the arrangement is such that, during processing, each sheet may be individually swung about its hinged axis 28 (as indicated by the dotted arrow 29) into a second position (FIG. 3) wherein the image-receptive surface 27 is in face-to-face relationship with an associated image-receptive surface or area 30 carried by the strip 21 rearwardly of the hinge axis. Preferably, but not necessarily, apertured spacing and liquid-trapping elements 31 will be secured to the strip 21 rearwardly of each hinge axis for purposes to be hereinafter described.

As shown in FIG. 1, strip 21 with its hinged sheets 26 in their normal position is preferably initially supplied for use in the form of a multilayer helix or roll, either self-supporting or wound on a suitable spool 32. In either case the strip is preferably wound so that the image-receptive surfaces of both the strip and hinged sheets face inwardly of the helix. Thus, when the strip is unwound during use, the leading edge 33 of each hinged sheet 26 will tend to curl slightly away from the front surface 23 of the strip, thereby facilitating its engagement by suitable mechanism within a camera for inverting it into the processing position shown in FIG. 3.

One of each associated pair of image-receptive surfaces or areas 27, 30 is photosensitive while the other is of a material which is receptive to a transfer image when processed in conjunction with the former. Emulsions and/or coatings of both types are well known and commonly used in image-transfer photography, and surfaces 27 and 30 may be coated with any such known emulsions, the specific compositions chosen having no direct bearing on the present invention. Which of the two is photosensitive in a particular case will, of course, depend upon the type of camera or processing apparatus with which the film is intended to be used. Thus, for example, in the embodiment shown in FIGS. 1–3, the image-receptive areas or surfaces 27 of sheets 26 are photosensitive while the associated image-receptive areas 30 on strip 21 are receptive to an image by transfer. In fact in the FIGS. 1–3 embodiment, the transfer-image-receptive areas 30 are constituted by portions of a continuous image-transfer-receptive coating 30' formed on the front surface 23 of the carrier strip 21, as best shown in FIG. 3.

Due to the usual masking within the conventional camera only the central portion 34 of the photosensitive layer 27 will normally be exposed to an image. The boundaries of this useful image area are indicated by the dash-dot lines 35 in FIG. 2. After processing to develop the negative image in this area, the border portions 36 outside of the area will therefore be transparent. Unless suitable provisions were made to guard against such effect, this would result in a black border around the positive picture obtained by transfer on the associated transfer-image-receptive surface 30. It is therefore desirable to mask these border portions during processing. To this end each image-receptive area 30 is preferably provided with a bordering mask which is impervious to the processing fluid and which outlines a useful positive image-area 39 slightly smaller in extent than the negative image-area 34. This will result in the desirable white border around the finished positive picture. The mask may be permanently bonded to the surface 30 or may, if desired, be strippable therefrom. Conveniently, mask 38 may be formed by coating the area to be masked with a suitable photographic resist lacquer which, of course, must be compatible with the particular image-receptive materials and processing fluid used in any specific case. As best shown in FIGS. 2 and 3 the carrier strip 21 can conveniently be provided with perforations 40 which determine the over-all size of the finished picture element and facilitate its removal from the strip after processing has been completed.

While I have shown a continuous coating or layer 30' of transfer-image-receptive material on strip 21 and have shown each sheet 26 to be coated with its photo-sensitive layer 27 over one entire surface, it will be obvious that only those portions of the strips or sheets which constitute the actual useful image areas 34 and 39 need be thus coated. However, the arrangement shown will normally be preferable from the manufacturing standpoint.

As previously indicated, in processing the film after exposure of the image area 34, the sheet 36 is folded over about its hinge axis 28 into face-to-face relationship with the opposing transfer-image-receptive surface 30, with a suitable viscous processing fluid applied therebetween. Here again, suitable processing fluids are well known in the image-transfer art and the specific composition selected has no bearing on the present invention. Obviously the particular fluid selected must be appropriate for the particular photo-sensitive emulsion and transfer-image-receptive coating used in the film product. In order to obtain best photographic results, it is essential that this layer of processing fluid completely cover the useful image receptive surfaces and be of uniform thickness. Moreover, since such fluid is normally quite corrosive it is highly desirable that it be confined to the film structure itself and not be permitted to escape into the interior of the camera or processing apparatus employed. The spacing and liquid-trapping elements 31 perform both of these functions. As best shown in FIG. 3 element 31 is adhesively secured to the marginal portion of mask 38 and is of such thickness that when the marginal portions of sheet 26 are pressed firmly thereagainst the space between layers 27 and 30 will be just sufficient to accommodate a layer 41 of processing fluid of the desired thickness. Element 31 is preferably (although not necessarily) formed of a material which has somewhat directional absorptive properties such that fluid tending to flow lengthwise of the film into contact with cross member 42 thereof will be readily absorbed, whereas fluid tending to flow laterally, since it can penetrate leg portions 43, 44 only with difficulty, will be restrained against further movement in that direction. Thus the slight excess of fluid which is normally utilized to insure proper processing, will soak into the cross-member 42 of mask 31 and will be prevented from escaping from the film product. Spacer element 31 may, for example, be formed of a plurality of thin layers of crimped or corrugated paper bonded together with their ridges or grooves, and preferably the majority of the paper fibers themselves, oriented longitudinally of the strip. Alternatively a porous, absorptive paper with the leg portions 43, 44 treated to prevent absorption could be used for element 31. Obviously, if desired spacing element 31 could also be so proportioned as to serve as the mask defining the positive print area 39, in which case, of course, the separate photographic resist lacquer mask 38 could be eliminated.

FIG. 4 shows a slightly modified form of composite film wherein the finished positive print is of the same width as the carrier strip. In this case the ends of the positive print are defined by perforations 45 and 46 extending across the full width of strip 21. Otherwise the film shown is substantially like that of FIGS. 1–3 and corresponding reference numerals have been applied to corresponding parts. This construction provides a slightly larger useful picture area for the same width film assembly.

In the form of the invention shown in FIG. 5 the carrier strip 21 is provided with a pad 47 of highly absorptive material, such as absorbent paper covered with gauze, positioned rearwardly of each of the spacer elements 31. Film of this type is particularly well adapted for use where the processing fluid is applied to the film assembly by means of a fluid dispensing nozzle, the pads 47 serving to wipe away excess fluid from the lip of the nozzle at the completion of the fluid dispensing operation and as the film is moved to its processing station. As is clearly shown in FIG. 5 each photosensitive sheet 26 is made relatively somewhat longer in this particular embodiment so that when the sheet has been inverted into its processing position as shown at the extreme right-hand end of FIG. 5, its end portion 48 will cover the pad 47 and therefore prevent contamination of the interior of the camera by any fluid residue thereon.

While it is desirable that film made in accordance with my invention include a spacing member and fluid trap 31, it is quite possible to utilize a film of considerably simpler construction as shown in FIG. 6, for example, while still retaining many of the advantages of the constructions heretofore described. Here the hinged sheets 26 are secured directly to the front surface 23 of the carrier strip 21, and no spacing or liquid-confining elements are employed. Confinement of the fluid, and proper thickness of the layer thereof, must therefore be obtained by means of suitable structure within the camera. FIG. 6 also illustrates another variation in that the photosensitive image-receptive areas 27 are located on the carrier strip 21 whereas the transfer-image-receptive areas 30 are carried by the hinged sheets 26 rather than the reverse arrangement as heretofore described. As was previously mentioned, either the sheets or the strip can carry either of the two types of image-receptive surfaces depending upon the particular type of camera or processor construction with which the film is intended to be used. Obviously also either arrangement is equally applicable to any of the embodiments illustrated.

In each of the previously described embodiments the individual sheets 26 have been secured to the carrier strip at intervals substantially equal to twice the length of each sheet, so that the normally uncovered surface of the carrier strip 21 intervening between adjacent sheets serves as the image-receptive area complementary to that on the sheet directly ahead thereof. It is, however, possible to vary this spacing considerably so long as the spacing is at least as great as the length of one of the sheets. In FIG. 7, for example, I have shown a modification wherein the spacing between sheets is but slightly greater than the length of a sheet. In this case the carrier strip 21 is shown as being provided with the transfer-image-receptive surface 30, which, prior to processing, is substantially completely covered by the series of photosensitive sheets 26. With film of this particular construction it is, of course, necessary that each sheet 26 be swung away from the surface of the carrier strip 21 to enable the sheet immediately ahead thereof to be inverted and placed into the desired face-to-face relationship with the image-receiving area 30 thereon directly to the rear of the hinge axis for that sheet. This is shown in FIG. 7 where sheet 26b is illustrated as having been lifted away from the strip 21 so that the leading sheet 26a could be moved into processing position relative to the associated transfer-image-receptive area 30a.

Any of the previously described embodiments of the invention could be provided with means for supplying the processing fluid for each frame. FIG. 8 shows such an arrangement using a film generally similar to that shown in FIG. 6 but wherein the sheets 26 are provided with the photosensitive surface 27 whereas the carrier strip 21 is provided with the transfer-image-receptive surfaces 30. In this case, a rupturable container or pod 70 of viscous processing fluid 41 is supported on the strip immediately behind each hinge. Pods of this type are well known in the image-transfer art and no detailed description is deemed necessary. Suffice it to say that each pod contains sufficient processing fluid for the associated individual frame and, during movement through a processing-type camera, is intended to be burst by pressure and the fluid therein spread between the associated pair of image-receptive areas, 27, 30. FIG. 9 shows one manner in which such a pod can be conveniently secured to the assembly by means of hinge strip 24.

In all of the previously described embodiments one of the image-receptive surfaces or layers has been formed directly on the carrier strip. However, it is quite possible, and in many cases preferable, to use a separate sheet secured to the carrier strip for each of the image-receptive areas of each associated pair. Film constructions of this type are illustrated in FIGS. 10–20.

Thus in the film construction shown in FIGS. 10–14, in addition to the hinged sheets 26 secured to the front face 23 of the carrier strip 21 there are provided, immediately to the rear of each of the hinges 24, additional sheets 50 having an image-receptive surface 30 thereon and of such width as to correspond to the desired final print. In this type of construction strip 21 may conveniently be of opaque paper such as is commonly used as backing for photographic films. As previously described, sheets 50 are preferably coated around their marginal portions with a thin layer of photographic resist lacquer 38 which, in this case, preferably extends also over the edges thereof as shown at 55 and 56 in FIGS. 12 and 14 respectively. This arrangement will provide the desirable white margins on the finished print and at the same time prevent any discoloration which might occur if processing fluid were permitted to come into contact with and be absorbed by the edges of the sheet 50. This embodiment also illustrates a slightly modified form of spacer and liquid-trapping element 51. It will be noted in particular in FIG. 11 that in this case the spacer element 51 is generally U-shaped, having laterally spaced legs 52 and 53 connected at their trailing ends by a cross member 54. Spacer 51 also lies entirely outside of the limits of the image-receptive sheet 50, preferably being adhesively secured directly to face 23 of strip 21, and therefore must have a greater thickness than was the case with the earlier described embodiments. However, as previously described in conjunction with these earlier embodiments, the spacing element will preferably possess somewhat directional absorptive characteristics so that any excess fluid will be relatively readily absorbed by the bridging portion 54 while legs 52 and 53 will prevent any undesired spread of the processing liquid to the sides of the assembly. Hinge strip 24 will prevent escape of the fluid 41 at the opposite end of the assembly. As best shown in FIGS. 11 and 14, the sheet 50 is preferably provided with a row of perforations 57 extending across its entire width and by means of which the image-bearing portion may be readily removed from the remaining end portion 58. Preferably only this later end portion 58 will be secured to the face of the carrier strip 21, as by a suitable adhesive, not shown.

FIG. 15 shows a modified film construction of the same general type as in FIGS. 10–14 but wherein the sheets 50 of receiver material extend substantially the full width of the carrier strip. In this case the spacing and fluid-trapping element 31 is of the same general type of construction as was shown in FIGS. 1–3 for example, and laps over the masked marginal portions 38 of the image-receiving sheet 50.

FIG. 16 shows a film construction of the same general type provided with a plurality of pads 47 of absorptive material for removing any excess fluid from the fluid distributing nozzle. Except for the fact that the image-receptive area is on a separate sheet 50 secured to the carrier strip, rather than on the strip itself, this form of film is substantially like that shown in FIG. 5.

FIG. 17 shows a simplified form of film construction using a backing strip 21 with associated pairs of image-receptive sheets 26 and 50 hingedly secured thereto but without employing any mask or fluid-trapping arrangement. This construction is quite similar to that of FIG. 6 and, as was mentioned in conjunction therewith, either of the sheets may be photosensitive while the other will be adapted to receive an image by transfer. In this particular case I have shown sheet 26 as having the photosensitive layer 27 while sheet 50 bears the transfer-image-receptive layer 30.

FIG. 18 shows a similar arrangement using pairs of sheets 26 and 50 hinged to the surface of the carrier strip 21 but with the spacing between pairs considerably closer. Except for the fact that separate sheets are used for one of the image-receiving surfaces rather than having this image-receiving surface formed on the strip itself, this form is substantially identical to that shown in FIG. 7 and the same general remarks apply thereto.

FIG. 19 shows still another form of my invention using pairs of sheets 26, 50 hinged to the front surface 23 of the carrier strip 21 and providing also, in association with each of the sets of sheets, a pod or container 60 for the processing fluid 41 used to process that particular pair. This particular embodiment is quite similar to that shown in FIG. 8, again varying therefrom primarily in the fact that separate sheets are used for the one image-receptive element rather than merely a coating on the carrier strip itself. The same remarks apply as applied to the description of the FIG. 8 embodiment.

FIG. 20 shows in detail the manner in which the pods and associated pair of sheets in the FIG. 19 embodiment may be mounted on the strip 21. It will be noted that, in this case, the pod is hingedly secured by adhesive hinge strips 24 and 61 to the image-receptive surfaces of sheets 26 and 50, which in turn are secured to carrier strip 21 by hinge strips 25 and 62 respectively.

With respect to all of the above embodiments it has been indicated that the right-hand end, as shown in the drawings, was intended to be the leading end of the film as it was to be pulled through the processing device or processing camera. While this is normally the preferred arrangement, since inverting the hinged sheets for processing in a camera or processing device is generally more readily and simply accomplished with such film construction, it is obvious that either end of the film product could be used as the leader during processing so long as appropriate sheet-inverting means is provided in the camera or processing device. Substantially the only difference is that in the one case (as shown) the hinged sheets are to be swung rearwardly into processing position whereas in the other, they would be swung forwardly into processing position superimposed upon their associated image-receptive areas.

It should also be noted that the drawings herein are not to scale, particularly as regards the thickness of the various sheets, strips, sensitized layers, etc. As is well known, materials used in the photographic art, even when comprised of several layers, are quite thin and it has therefore been necessary to exaggerate the thicknesses in many instances herein in order to properly illustrate the construction involved. In practice, the only really critical thickness involved is that of the spacer 31 which, as described above, should be of such thickness as to give the desired thickness to the layer of processing fluid. While this will vary with different materials, this processing layer should ordinarily be in the general range of .001″ to .005″ thick.

While I have shown many embodiments of my invention, it is obvious that many others could be made without departing from the general principles involved. For example, it is obvious that pods or containers 60 could be applied to any of the embodiments shown if it were deemed desirable to utilize this particular mode of fluid application. On the other hand, if it were deemed desirable, wiper pads of the type shown in FIGS. 5 and 16 could be applied to any of the other types of film construction shown in this application. As was also previously mentioned, whether a spacing and liquid-trapping member is used with any particular film construction will depend upon the type of camera or processing equipment with which it is intended to be used. Similarly whether the leading sheet of each associated pair of photosensitive while the trailing one is transfer-image receptive, or the reverse arrangement is used, is strictly a matter of choice depending upon the type of equipment with which the film is to be used. It would merely unnecessarily complicate this application to attempt to show all of the various possible rearrangements of the elements illustrated herein. The particular embodiments shown are intended merely to be illustrative of the various arrangements that could be used and it is to be understood that various modifications and revisions could be made without departing from the spirit and scope of the invention as defined by the appended claims.

I claim:
1. A composite photographic product comprising:
    an elongated carrier strip having a leading end portion,
    a plurality of relatively short sheets superimposed upon and lying in substantially face-to-face relationship with one face of said strip and each including an outwardly-facing image-receptive area,
    hinge means individualy securing said sheets along their trailing edges directly to said one face of said strip at longitudinally spaced locations therealong,
    the axis of each such hinge means being located closely adjacent the trailing edge of its associated sheet and being fixed in position relative to said strip,
    the spacing between adjacent hinge means being at least as great as the length of the individual sheets,
    at least that portion of said face of said strip rearwardly of each of said hinge means also being provided with an image-receptive area located substantially symmetrically about the axis of the associated hinge means relative to the image-receptive area of the associated sheet,
    each of said sheets being swingable about the axis of its hinge means into a position wherein it extends rearwardly therefrom with its image-receptive area in substantial face-to-face relationship with the associated image-receptive area on said strip for conjoint processing therewith,
    one of the image-receptive areas of each associated pair being photosensitive,
    and the other being receptive to a transfer image upon processing in conjunction with the associated photosensitive area, said strip, prior to processing, being coiled upon itself in the form of a multi-layer helix with said leading end outermost and with said one face of said strip facing inwardly of said helix whereby it is concavely curved, said sheets each being arranged in said first superimposed position on said face of said strip.
2. A composite photographic product as in claim 1, at least the leading end portion of the said strip, forming the outermost convolution of said helix, being opaque to light which is actinic to said photosensitive area.

References Cited
UNITED STATES PATENTS

| | | | |
|---|---|---|---|
| 2,572,358 | 10/1951 | Land | 96—29 X |
| 3,152,529 | 10/1964 | Erlichman | 95—13 |
| 3,152,530 | 10/1964 | Eloranta | 95—13 |
| 2,543,181 | 2/1951 | Land | 96—76 X |
| 2,565,377 | 8/1951 | Land | 96—76 |
| 2,616,805 | 11/1952 | Land | 96—29 X |
| 2,627,460 | 2/1953 | Land | 96—29 |

NORMAN G. TORCHIN, *Primary Examiner.*

J. TRAVIS BROWN, *Examiner.*

D. LEVY, *Assistant Examiner.*